Figures 1, 2:
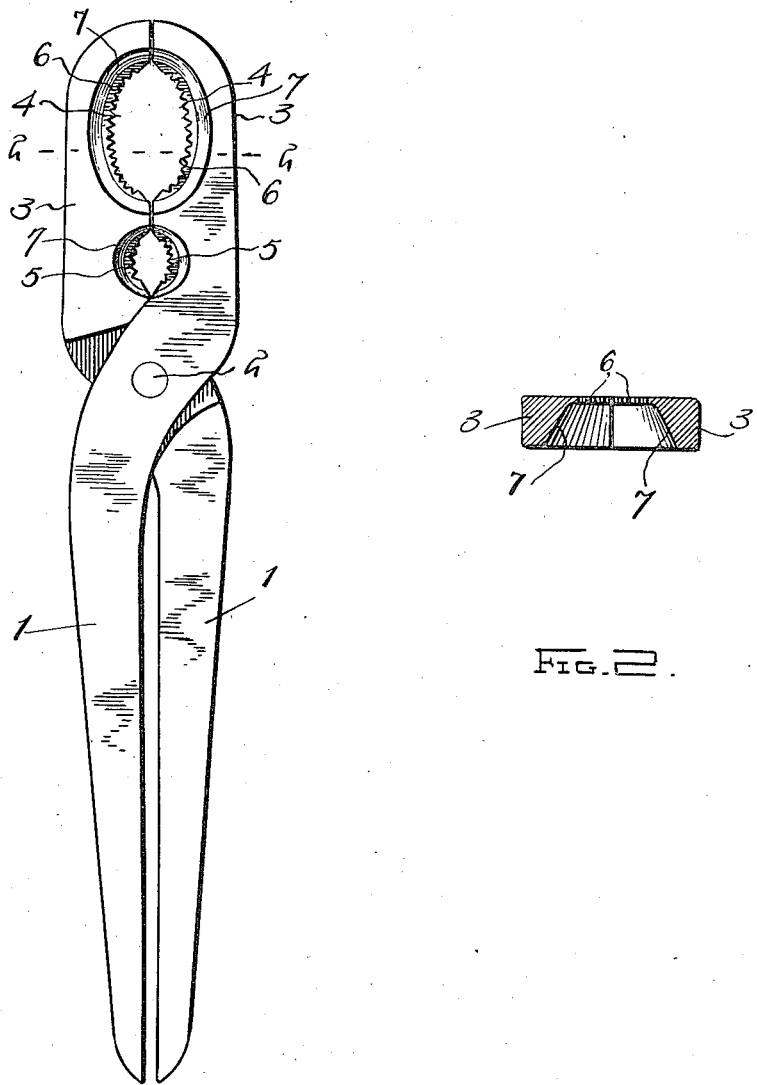

A. E. KAMMER.
METAL TUBING CUTTER.
APPLICATION FILED NOV. 15, 1915.

1,195,591. Patented Aug. 22, 1916.

Witnesses

Inventor
A. E. Kammer.
By
Attorneys

UNITED STATES PATENT OFFICE.

ANDREW E. KAMMER, OF BROOKLYN, NEW YORK.

METAL-TUBING CUTTER.

1,195,591. Specification of Letters Patent. Patented Aug. 22, 1916.

Application filed November 15, 1915. Serial No. 61,721.

*To all whom it may concern:*

Be it known that I, ANDREW E. KAMMER, a citizen of the United States, residing at Brooklyn, in the county of Kings, State of New York, have invented certain new and useful Improvements in Metal-Tubing Cutters; and I do hereby declare the following to be a full, clear, and exact description of the invention, such as will enable others skilled in the art to which it appertains to make and use the same.

This invention relates to a device for cutting metal tubing.

An object of the invention resides in the provision of a device by means of which metal tubing of various sizes may be easily and effectively cut.

A further object of the invention resides in so constructing the device that a plurality of cutting teeth are provided.

A still further object of the invention resides in so constructing the jaws and cutting teeth that the latter may be readily sharpened when they become dull.

With these and other objects in view, such as will appear as my description progresses, my invention comprises the combination and arrangement of parts as set forth in and falling within the scope of the appended claim.

In the drawing: Figure 1 is an elevational view of a device constructed in accordance with my invention, and Fig. 2 is a sectional view on line 2—2 of Fig. 1 showing the manner in which the cutting teeth are formed on the jaws.

Referring to the drawing by reference characters wherein like parts are indicated by like characters throughout the several views, the form of my device illustrated includes a pair of handle members 1 which are pivoted together, at 2 and which terminate in jaws 3.

In order that tubing may be cut when gripped between the jaws and when the device is rotated, I have provided each of the jaws with a pair of depressions 4 and 5, the latter being smaller than the former. The depressions 4 and 5 in one jaw coöperate with the corresponding depressions in the other jaw to form chambers for the reception of the tubing. These jaws are provided with teeth 6 which line the edges of the chambers as illustrated in the figures of the drawing so that when a piece of tubing is gripped in either of the chambers and the device is rotated the teeth will cut or saw the tubing.

Now it is obvious that the continued use of this device would dull the teeth and in order that the teeth may be sharpened from time to time, conveniently, I have inclined the walls of the chambers away from the teeth as illustrated, at 7 in Fig. 2 of the drawing. It will be seen that when the teeth wear down and become dull that they may be readily filed and the fact that the walls of the chambers are inclined will materially assist in the sharpening of the teeth.

From the foregoing description it will be seen that I have provided a device for cutting metal tubing which is provided with cutting teeth and I have so constructed the jaws on which the cutting teeth are mounted that the teeth may be effectively and readily sharpened.

What I claim is:—

In a device for cutting metal tubing, a pair of pivoted handle members terminating the jaws, said jaws having depressions therein which coöperate to form chambers for the reception of the tubing, the said chambers being lined at one side with teeth and the walls of the chambers being inclined away from the teeth.

In testimony whereof, I affix my signature, in the presence of two witnesses.

ANDREW E. KAMMER.

Witnesses:
JOHN KAMMER, Jr.,
Mrs. K. STUMPF.